United States Patent [19]

Vianello et al.

[11] Patent Number: 5,338,796
[45] Date of Patent: Aug. 16, 1994

[54] THERMOPLASTIC COMPOSITION BASED ON POLYPHENYLENE ETHER AND POLYAMIDE

[75] Inventors: Domenico Vianello, Campalto; Armando Benetton, Treviso; Alessandro Moro, Cazzago; Roberto Pippa, Noale; Aldo Longo, Castelnuovo Angeli frazione di Curtatone, all of Italy

[73] Assignee: Montedipe s.r.l., Milan, Italy

[21] Appl. No.: 15,106

[22] Filed: Feb. 9, 1993

Related U.S. Application Data

[63] Continuation-in-part of Ser. No. 672,802, Mar. 21, 1991, abandoned.

[30] Foreign Application Priority Data

Mar. 22, 1990 [IT] Italy ............................ 19777 A/90

[51] Int. Cl.$^5$ .................. C08L 23/16; C08L 71/12; C08L 77/06
[52] U.S. Cl. ................. 525/66; 524/504; 524/508; 524/514; 525/68; 525/133; 525/397; 525/905
[58] Field of Search .......... 525/68, 66, 133, 397, 525/905; 524/504, 508, 514

[56] References Cited

U.S. PATENT DOCUMENTS

| | | | |
|---|---|---|---|
| 3,943,191 | 3/1976 | Cooper et al. | 525/68 |
| 4,929,675 | 5/1990 | Abe et al. | 525/66 |
| 5,102,952 | 4/1992 | Memon | 525/68 |
| 5,143,955 | 9/1992 | Kendall et al. | 525/92 |
| 5,166,238 | 11/1992 | Nakano et al. | 526/348.1 |

FOREIGN PATENT DOCUMENTS

| | | |
|---|---|---|
| 0270246 | 10/1987 | European Pat. Off. . |
| 0268486 | 11/1987 | European Pat. Off. . |
| 0319339 | 6/1989 | European Pat. Off. . |
| 0358892 | 3/1990 | European Pat. Off. . |

OTHER PUBLICATIONS

Patent Abstract of Japan, vol. 12, No. 28 (C471) (2875) Jan. 27, 1988.
European Search Report, The Hague, Jun. 9, 1992, Examiner A. Gladdier.

*Primary Examiner*—James J. Seidleck
*Assistant Examiner*—Thomas Hamilton, III
*Attorney, Agent, or Firm*—Morgan & Finnegan

[57] ABSTRACT

A thermoplastic composition having a good balance of mechanical and thermal properties, an improved impact strength and a good processability includes a functionalized polyphenylene ether, a polyamide, and an olefinic elastomer containing a vinylaromatic monomer grafted thereon.

21 Claims, No Drawings

THERMOPLASTIC COMPOSITION BASED ON POLYPHENYLENE ETHER AND POLYAMIDE

CONTINUING DATA

This application is a continuation-in-part of prior application Ser. No. 07/672,802, filed on Mar. 21, 1991, now abandoned, the subject matter of which is incorporated herein by reference.

FIELD OF THE INVENTION

The present invention relates to a thermoplastic composition based on a polyphenylene ether and a polyamide.

More in particular, the present invention relates to a composition having a good balance of mechanical and thermal properties, an improved impact strength and a good processability, and comprising a polyphenylene ether and a polyamide.

BACKGROUND OF THE INVENTION

The polyphenylene ether resins (also known as polyphenylenoxide resins) represent a well-known technopolymer family and are characterized by a good combination of thermal, mechanical and electrical properties within a wide temperature range. This combination of properties makes the polyphenylene ether resins suitable for being used in a great variety of appliances by means of injection molding or extrusion techniques.

In spite of these several possible commercial appliances of the polyphenylene ether resins (PPE), their utilization is limited due to their low processability mainly attributable to their low fluidity in the molten state, that can cause some difficulties during the extrusion and injection molding operations.

A further drawback is that the polyphenylene resins have a low resistance to solvents after molding and a low resiliency (IZOD), wherefore the use thereof for certain appliances is furtherly limited.

To obviate these shortcomings it was suggested to mix the polyphenylene ether resins with other polymers, which possess said lacking properties.

Thus, for example, U.S. Pat. No. 3,379,792 suggests to improve the fluidity of the polyphenylene ether resins by adding a polyamide. According to the teachings of this patent, however, the mixes are limited to a polyamide concentration up to 25% by weight; in fact, a higher amount of polyamide involves delamination and a remarkable decay of the other physico-mechanical properties such as resiliency.

Apart from this teaching, it is known in literature that polyphenylene ether resins and polyamide resins are not fully compatible with each other in a wide range of proportions, and that poor properties and phase separation occur when the polyamide amount is rather high.

To obviate this drawback it is known in literature to add to the mixture an additive which is reactive with polyphenylene ether resins and polyamide and which is generally known as compatibilizing agent.

Thus, accordingly to U.S. Pat. No. 4,315,086 and the corresponding European Patent No. 24,120, compositions comprising polyphenylene ether and a polyamide, having superior resilience characteristics and an excellent processability, are prepared by mixing the two polymers in the molten state with 0.01–30% by weight of a compound selected from the group consisting of: a) a liquid diene polymer; b) an epoxy compound and c) a compound having in its molecule both (i) a double ethylenic bond C=C or a triple bond C≡C, and (ii) a carboxylic, anhydride, amide, imide group, a carboxylic, amino or hydroxyl ester.

Japanese patent publication No. 84/66452 describes similar polymeric compositions prepared by using a polyphenylene ether, which has been pre-treated with one of the above-indicated olefinic compounds a)–c), in the presence of a free radical starter.

However, the resulting compositions do not exhibit an excellent balance of properties and, furthermore, the resilience (impact strength) improvements are not yet sufficient.

With a view to obtaining a further improvement of this characteristic it was proposed, in literature, that a rubber, or an elastomeric polymer having a second order transition temperature (Tg) lower than 10° C. should be added to the polyphenylene ether -polyamide-compatibilizing agent compositions.

U.S. Pat. No. 4,315,086 proposes, to this purpose, to add natural rubbers, butadiene polymers, butadiene/styrene copolymers, isoprene polymers, butadiene/acrylonitrile copolymers, acrylic esters polymers, ethylene/propylene copolymers, ethylene/propylene/-diene terpolymers, etc.

International patent application PCT/US/86/O1511 and U.S. Pat. No. 4,654,405 describe thermoplastic compositions comprising compatibilized polyphenylene ether, polyamide and an impact modifier such as e.g. a polystyrene-polybutadiene-polystyrene three-block copolymer (S-B-S).

International patent application PCT/US/87/00479 describes thermoplastic compositions comprising functionalized polyphenylene ether, polyamide and an impact modifier consisting of a selectively and partially hydrogenated two-block copolymer of the A-B type, wherein block A is a styrene polymer and block B is an ethylene/propylene polymer.

European patent application No. 236,596 describes a polymeric composition comprising a polyphenylene ether, a polyamide, an agent capable of improving the compatibility of the polyamide and of the polyphenylene ether and an agent suited to improve the impact strength of the mix and which can be an ethylene/propylene copolymer or an ethylene/propylene/conjugated diene terpolymer, on which a vinyl monomer having an acid carboxylic group or a derivative thereof or an epoxy group has been grafted.

Laid-open European patent application No. EP-A-270246 describes a thermoplastic composition based on a polyphenylene ether and a polyamide containing from 5 to 100 parts, calculated on 100 parts of the mix, of a copolymer consisting of an ethylene/alpha-olefin rubber-like copolymer, an alkenyl aromatic compound and an unsaturated carboxylic acid or an anhydride thereof, which not only is compatible with the composition of the two polymers, but also causes a remarkable improvement of the impact strength. To this end, the presence of the unsaturated carboxylic acid or of its anhydride is considered, in said patent, as absolutely necessary.

The compositions so obtained, however, do not exhibit a best property combination for all the uses they are intended for.

In particular, the presence of the unsaturated carboxylic acid or of its anhydride, grafted on the ethylene/alpha-olefin rubber-like copolymer, improves the compatibility, but to the prejudice of the impact strength, which decreases as the amount of said acid or grafted anhydride increases.

DESCRIPTION OF THE INVENTION

It has now been found by the Applicant that a thermoplastic composition based on polyphenylene ether and polyamide having a high flowability in the molten state, and therefore a good processability, and an excellent balance of thermal and mechanical properties as well as an excellent impact strength, can be prepared by mixing in the molten state:

a. polyphenylene ether functionalized with at least a compound containing in its molecular structure at least a double or triple carbon-carbon bond and at least a carboxylic acid group, an anhydride group, an amide group, an imide group, an ester group, an amino or a hydroxy group;
b. a polyamide, and
c. an olefinic elastomer containing a vinylaromatic monomer grafted thereon.

Thus, it is an object of the present invention to provide a thermoplastic composition having an excellent balance of mechanical and thermal properties, a high impact strength and a good flowability in the molten state, and comprising:

100 parts by weight of a resinous composition comprising: (A) 5–95% by weight of a polyphenylene ether functionalized with a compound containing in its molecular structure at least a double or triple carbon-carbon bond and at least an acid carboxylic, anhydride, amide, imide, ester, amino or hydroxyl group, and (B) 95–5% by weight of a polyamide, and (C) 1–100 parts by weight, for 100 parts of mix A+B, of an olefinic elastomer containing a vinylaromatic monomer grafted thereon.

The thermoplastic compositions of the present invention comprise the above-indicated components A, B and C preferably in the following proportions referred to the sum of the three components:

A. from 25 to 70% by weight of a functionalized polyphenylene ether of the above-indicated type;
B. from 25 to 70% by weight of a polyamide, and
C. from 5 to 50% by weight of an olefinic elastomer containing a vinylaromatic monomer grafted thereon;

the sum of the three components A, B and C being equal to 100.

The vinylaromatic monomer content in the olefinic elastomer is higher than 1% by weight preferably it ranges from 30 to 60% by weight.

The polyphenylene ethers used in the compositions of the present invention are a well-known class of polymers. They are broadly utilized in the industry, especially as technopolymers in appliances which require tenacity and thermal stability.

These polyphenylene ethers are polymers and copolymers which comprise a plurality of structural units of formula:

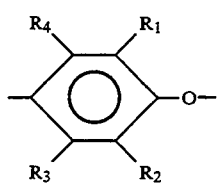

(I)

wherein $R_1$, $R_2$, $R_3$ and $R_4$ represent, independently of one another, a substituted and non-substituted hydrocarbon radical, a halogen or hydrogen atom.

Examples of $R_1$, $R_2$, $R_3$ and $R_4$ are hydrogen, a halogen such as chlorine, bromine or fluorine, a hydrocarbon radical containing from 1 to 18 carbon atoms such as for example an alkyl radical or a substituted alkyl radical such as methyl, ethyl n.- and iso-propyl, n.-, sec.- and ter.-butyl, n.anyl, n.hexyl, 2,3-dimethylbutyl, chloroethyl, hydroxyethyl, phenylethyl, hydroxymethyl, carboxyethyl, methoxycarbonylethyl, cyanoethyl, aryl or substituted aryl radicals such as phenyl, chlorophenyl, methylphenyl, dimethylphenyl, ethylphenyl, a benzyl radical or an allyl radical.

These polymers and the processes for preparing them are broadly described in literature. As an example, reference is made to U.S. Pat. Nos. 3,226,361; 3,234,183; 3,306,874; 3,306,875; 3,257,357; 3,257,358, etc., the content of which is included in the present specification as a reference.

Preferred polyphenylene ethers of the present invention are the ones having formula:

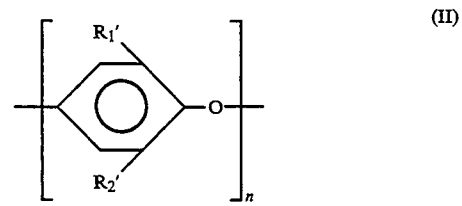

(II)

in which $R'_1$ and $R'_2$, independently of each other, are an alkyl radical containing from 1 to 4 carbon atoms and n is at least 50 and preferably ranges from 60 to about 600.

Illustrative examples of polyphenylene ethers which are particularly suitable for the compositions of the present invention are:

poly(2,6-di-methyl-1,4-phenylene)ether;
poly(2,6-di-ethyl-1,4-phenylene)ether;
poly(2-methyl-6-ethyl-1,4-phenylene)ether;
poly(2,6-di-propyl-1,4-phenylene)ether;
poly(2-ethyl-6-propyl-1,4-phenylene)ether and the like; the most preferred is poly(2,6-di-methyl-1,4-phenylene)ether.

The term "polyphenylene ether", whenever used in the present specification and in the claims, includes both the homopolymers and the copolymers containing the structural units of formula (I) indicated hereinbefore, such as e.g., the copolymers comprising units derived from 2,6-di-methyl phenol and 2,3,6-tri-methyl phenol; as well as the grafted copolymers prepared by grafting one or more vinyl monomers such as acrylonitrile or vinylaromatic compounds such as styrene or polymers such as polystyrene or elastomers onto the polyphenylene ether chain.

Polyphenylene ethers generally have a number average molecular weight (determined by gel permeation chromatography) ranging from 5,000 to 120,000 and their inherent viscosity is higher than 0.1 dl/g and very often ranges from 0.30 to 0.90 dl/g, measured in chloroform at 23° C.

These polyphenylene ethers can be produced by oxidation of a phenol compound with oxygen or an oxygen-containing gas in the presence of a catalyst for the oxidative coupling. Any known catalyst suitable for the oxidation polymerization can be utilized. Generally they contain at least a compound of a heavy metal such as copper, manganese or cobalt usually in combination with other types of catalytic compounds. Examples of suitable catalysts are the ones containing a cuprous or cupric salt such as for example a cuprous salt in combination with a tertiary amine and/or a secondary amine, such as for example cuprous chloride-trimethylamine and dibutylamine, cuprous acetatetriethylamine or cuprous chloride-pyridine; or a cuptic salt in combination with a tertiary amine and a hydroxide of an alkaline metal, such as cupric chloride-pyridine-potassium hydroxide; these catalysts are described, for example, in U.S. Pat. Nos. 3,306,874; 3,306,875; 3,914,266 and 4,028,341, the subject matter of which is incorporated herein by reference.

Another class of suitable catalysts are the ones containing manganese or cobalt, very often complexed with one or more chelating and/or complexing agents such as dialkylamines, alkanoamines, alkylenediamines, o-hydroxyaromatic aldehydes, o-hydroxyazo compounds, omega-hydroxy-oximes, o-hydroxy-aryl-oximes and beta-diketones. All these catalysts are well known in literature and are described, for examples, in U.S. Pat. Nos. 3,956,242; 3,962,181; 3,965,069; 4,075,174; 4,093,595-598; 4,102,865; 4,184,034 and 4,385,168, the subject matter of which is incorporated herein by reference.

The functionalizing compound utilized according to the present invention contains, as mentioned above, one or more double or triple carbon-carbon bonds in combination with various functional groups comprising amino, hydroxy, carboxylic groups and derivatives of carboxylic acids such as anhydride, amide, imide and ester. Some examples of these functionalizing compounds are maleic acid, fumaric acid, malein anhydride, maleimide such as N-phenylmaleimide and 1,4-phenylene-bis-mehtylene-α-α'-bismaleimide, maleic hydrazide, unsaturated carboxylic acids such as acrylic acid, crotonic acid, methacrylic acid and oleic acid, unsaturated alcohols such as allyl alcohol and crotyl alcohol and unsaturated amines such as allylamines.

The preferred compounds are maleic anhydride, maleimides and fumaric acid, in particular the first compound due to its high reactivity.

The functionalized polyphenylene ethers are preparable by simple mixing the two reagents either or not in the presence of free radical starters under conditions, which are suited to the formation of an intimate mixture and at temperatures, which are high enough to obtain a molten product; typical temperatures are 230°–350° C.

Another method which can be utilized for preparing the functionalized polyphenylene ethers consists in dissolving the polyphenylene ether in a proper solvent, for example toluene, and then in adding the functionalizing compound and a free radical inhibitor (such as benzoylperoxide), they too dissolved in a solvent preferably like the one in which the polymer is dissolved. The solution is then heated to a temperature higher than 80° C., for example of 100–120° C., and then the reaction product is separated by precipitation.

The proportions of polyphenylene ether and of functionalizing compound are not critical. Generally, about 0.01–5 parts and preferably about 0.1–3 parts by weight of functionalizing compound are present for 100 parts by weight of polyphenylene.

The polyamides which are suited to prepare the compositions of the present invention can be prepared by polymerization of monoamino-carboxylic acids or the corresponding lactams having at least two carbon atoms between the amino group and the carboxylic group; or by polymerization of substantially equimolar amounts of a diamine which contains at least two carbon atoms between the aminic groups and a bicarboxylic acid; or also by polymerization of a monoamino-monocarboxylic acid and a lactam thereof, as defined above, along with a substantially equimolar amount of a diamine and of a dicarboxylic acid. The dicarboxylic acid can be utilized in the form of a derivative thereof such as, for example, an ester or an acid chloride.

The term "substantially equimolecular" is used to designate both strictly equimolecular amounts and little deviations therefrom, as is required by the conventional techniques in order to stabilize the viscosity of the resulting polyamides.

Examples of monoamino-monocarboxylic acids or lactams thereof, which are utilizable for preparing polyamides, comprise the compounds containing from 2 to 16 carbon atoms between the aminic group and the carboxylic group, said carbon atoms forming a ring with the —CO—NH— group in the case of lactams. Typical examples of aminocarboxylic acids and lactams are: omega-amino-caproic acid, butyrolactam, pivalolactam, caprolactam, capryl-lactam, enato! actam, undecanolactam, dodecanolactam, 3- and 4-amino-benzoic acid, etc.

Diamines, which are suitable for being utilized in the preparation of polyamides, comprise alkyl diamines having a straight or branched chain, aryl diamines, and alkyl-aryl diamines.

Examples of diamines are the ones having the general formula:

$$H_2N-(CH_2)_p-NH_2 \qquad (III)$$

wherein p is an integer ranging from 2 to 16, such as trimethylene diamine, tetra-methylene diamine, penta-methylene diamine, octa-methylene diamine and particularly hexamethylene diamine, as well as tri-methyl-hexamethylenediamine, meta-phenylene diamine, meta-xylilene diamine and the like.

The bicarboxylic acids can be either aliphatic or aromatic. Among the aromatic acids, isophthalic acid and terephthalic acid are to be cited.

The preferred acids are the ones of formula:

$$HOOC-R-COOH \qquad (IV)$$

wherein R is an aliphatic divalent group containing at least two carbon atoms and preferably from 2 to 18 carbon atoms, such as e.g. sebacic acid, octadecandioic acid, suberic acid, glutaric acid, pimelic acid and adipic acid.

Typical examples of polyamides or nylon, as they are usually called, are: nylon 6, nylon 6,6, nylon 11, nylon 12, nylon 6,3, nylon 6,4, nylon 6,10 and nylon 6,12.

Partially aromatic polyamides too can be utilized in the compositions of the present invention. The term "partially aromatic polyamides" means those polyamides which are obtained by substituting, in part or in whole, an aromatic residue for an aliphatic residue of an aliphatic nylon.

For examples, the polyamides resulting from terephthalic and/or isophthalic acid and trimethyl-hexamethylene diamine, from adipic acid and meta-xylilene diamine, from adipic acid, azelaic acid and 2,2-bis-(p-aminocyclohexyl) propane, or from terephthalic acid and 4,4'-diamino-dicyclohexylmethane.

Mixtures and/or copolymers of two or more of the above-cited polyamides or of prepolymers thereof can be used as well.

Preferred polyamides are nylon 6, nylon 6,6, nylon 11 and nylon 12; more in particular nylon 6 and nylon 6,6.

The term "polyamide", whenever used in the present specification and in the appended claims, comprises also the block polyamides of types A-B and A-B-A, in which A is a polyamidic block and B is a polyalkylene glycol.

The average molecular weight of the polyamides is advantageously higher than 10,000 and preferably higher than 15,000, and the melting point is preferably higher than 200° C.

The olefinic elastomeric component on which the vinylaromatic monomer is grafted is a rubber-like copolymer, having a Mooney viscosity ranging from 10 to 150 ML-4 at 100° C., of at least two different alpha-mono-olefins having a straight chain such as ethylene, propylene, butene-1, octene-1 and the like, with at least another copolymerizable monomer, generally a polyene and typically a non-conjugated diene. Preferably one of the alpha-mono-olefins is ethylene together with another alpha-mono-olefin having a longer chain. The weight ratio of ethylene to the other alpha-mono-olefin in the rubber-like copolymer is usually in the range of from 20/80 to 80/20. Particularly preferred copolymers are the ethylene/propylene/non-conjugated diene terpolymers in which the non-conjugated diene can be cyclic or acyclic such as: 5-methylene-2-norbornene; 5-ethylidene-2-norbornene; 5-isopropylene-3-norbornene; pentadiene-1,4; hexadiene-1,4; hexadiene-1,5; heptadiene-1,5; dodecatriene-1,7,9; methyl-heptadiene-1,5; norbornadiene-2,5; cyclo-octadiene-1,5; dicyclopentadiene; tetrahydroindene; 5-methyl-tetrahydroindene, etc. The diene content ranges from about 2 to 20% by weight and preferably from 8 to 18% by weight of diene monomeric units in the rubber-like terpolymer. Particularly interesting results are obtained by using a rubber-like terpolymer having a Mooney viscosity (ML-4), determined at 100° C., ranging from 30 to 90 and a iodine number higher than 5 and preferably ranging from 10 to 40. The term "vinylaromatic monomer", whenever used in the present specification and in the appended claims, comprises the ethylenically unsaturated compounds having general formula:

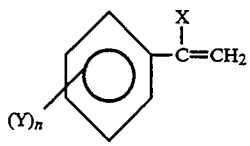

(V)

wherein:
X represents hydrogen or an alkyl radical having from 1 to 4 carbon atoms;
Y represents hydrogen, a halogen or an alkyl radical having from 1 to 4 carbon atoms, and
n is 0 or an integer from 1 to 5.

Examples of vinyl-aromatic monomers having the above-indicated general formula are: styrene; methyl-styrene; mono-, di-, tri-, tetra- and penta-chlorostyrene and the corresponding alpha-methyl-styrene; styrenes which are alkylated in the nucleus and the corresponding alpha-methyl-styrenes such as ortho- and para-methyl-styrenes, ortho- and para-ethyl-styrenes, ortho- and para-methyl-alpha-methyl-styrenes etc.

These monomers can be utilized either alone or in admixture with one another.

It is understood that in the grafting polymerization not all the vinyl-aromatic monomer is grafted on the rubber-like substrate; a portion of the monomer forms a free polymer which is present in physical admixture with the grafted polymer.

Preferably, the vinyl-aromatic polymer molecular weight favourably influences the impact strength characteristics of the mixtures. Thus, for example, excellent impact strength results are obtained with vinylaromatic polymers having a molecular weight greater than about 600,000 to about 1,700,000, preferably 900,000 to 1,300,000.

The amount of vinylaromatic polymer grafted on the olefinic elastomer is not critical and generally ranges from 10 to 50% by weight calculated on the grafted polymer, while the free vinylaromatic polymer ranges from 10 to 50% by weight.

The amount of monomer grafted on the polymer can be determined by extraction of the product with a solvent of the ungrafted resin.

The amount of olefinic elastomer containing, grafted thereon, the vinylaromatic monomer can reach 100 and preferably ranges from 5 to 50 parts by weight on 100 parts by weight of the mixtures of the functionalized polyphenylene ether and polyamide. Amounts lower than 5 parts by weight have a negligible effect on the impact strength of the compositions, while amounts higher than 100 parts by weight strongly influence the impact strength, but to the detriment of other properties. Thus, in order to obtain compositions having an excellent balance of properties it is advisable to maintain the olefinic elastomer content below 100 parts by weight and preferably below 50 parts by weight.

In addition to components A, B and C, the compositions of the present invention can contain reinforcing additives such as for example glass fibers, carbon fibers, organic and inorganic high-modulus fibers, metal fibers, inorganic fillers, etc., as well as antiflame agents, dyestuffs, pigments, stabilizers, lubricants, etc., which are well-known to those skilled in the art.

The reinforcing additives can be used in amounts generally not exceeding 50% by weight and preferably not higher than 30% by weight calculated on the total composition.

Particularly preferred reinforcing additives are the glass fibers which can be untreated or, better, treated with silanes or titanates, as is well-known to the technicians and to the manufacturers of said fibers.

Suitable stabilizers to be used in the compositions of the present invention comprise many of the known thermal and oxidation stabilizers which are suitable and generally utilized for polyamides, polyphenylene ether resins or elastomers. For example, liquid phosphates and hindered phenols can be added to the compositions of the present invention in amounts which can range from 0.05 to 5% by weight.

The method for producing the compositions of the present invention is not critical and any conventional method is utilizable.

Generally, mixing is carried out in the molten state, and time and temperature are selected and determined as function of the composition. The temperatures are generally in the range of from 200° to 300° C.

Any known mixing unit can be utilized. The method can be continuous or discontinuous. Specifically, single-screw and two-screw extruders, Banbury mixers, mixing rollers and the like can be used.

Although all the composition components can be introduced at the beginning and directly into the mixing unit, in a few cases it is preferable to pre-mix one of the two resins, preferably polyphenylene ether, with the olefinic elastomer (C).

The compositions of the present invention are easily processable by injection molding or by extrusion and exhibit a complex of properties which make them suited to be utilized for the manufacture of shaped articles having a high impact strength along with a good thermal stability and a low water sensitivity. Thanks to these properties, the compositions of the present invention can be used in the motor transport sector, for the manufacture of articles which can be furnace-painted, parts which enter into contact with motors, household electric apparatus, electronic articles and technical articles in general in the form of cups, pans, boxes, containers, panels, sheets, rods, etc.

EXAMPLES

In order to better understand the present invention and to reduce it to practice, a few illustrative examples are given hereinafter, which however are not limitative of the scope of the invention.

Example 1

Preparation of the functionalized polyphenylene-ether resin

Into a one-liter reactor equipped with stirrer, reflux condenser and thermostatic bath, there were introduced:

100 g of poly(2,6-di-methyl-1,4-phenylene)ether having an intrinsic viscosity of 0.47 (in chloroform at 23° C.), dissolved at 105° C. in 350 ml of toluene;

50 ml of toluene containing, in solution, 3 g of maleic anhydride;

0.5 g of benzoyl peroxide.

The mixture was heated to 110° C. and maintained at this temperature for 1 hour. After cooling to 70° C., the reaction product was poured into 1,500 ml of acetone. The resulting precipitate was filtered, washed with acetone until complete removal of the residual free maleic anhydride, and dried in an oven at 90° C. under vacuum (10 mm Hg) for 6 hours.

Poly(2,6-di-methyl-1,4-phenylene) ether containing bound groups derived from maleic acid was obtained. The maleic acid content was equal to 0.42% calculated on the functionalized polymer.

Preparation of the composition

Into a Brabender plastograph equipped with a 50 ml cell and heated to 240° C. there was introduced a mixture, prepared at room temperature, composed of:

70% by weight of poly(2,6-di-methyl-1,4-phenylene)ether functionalized with maleic anhydride, as obtained above;

30% by weight of an EPDM grafted elastomer with styrene having the following composition: 40% by weight of EPDM (Mooney viscosity equal to 62–72 ML-4 at 100° C. and a iodine number equal to 18), 28% by weight of grafted styrene and 32% by weight of styrene in the form of homopolymer having a weight molecular weight (Mw) equal to 1,119,000, mixed with said rubber.

The Brabender mastication speed was programmed according to a cycle of 50-120-50 r.p.m. and the residence time of the mixture in the plastograph was of 4 minutes.

The mixture leaving said first Brabender plastograph was fed to a second plastograph of the same type, together with nylon 6 and functionalized poly(2,6-di-methyl-1,4-phenylene)ether, as obtained above, in the following proportions:

33.3% by weight of the mixture leaving the first plastograph, consisting for 70% of functionalized poly(2,6-di-methyl-1,4-phenylene)ether and for 30% of grafted EPDM elastomer;

41% by weight of nylon 6 produced by Montedipe S.r.l. under the trademark "TERNIL® B27", having an average molecular weight of 18,000, and 25.7% by weight of the above-obtained poly(2,6-di-methyl-1,4-phenylene)ether functionalized with maleic anhydride.

Operative conditions were like the ones of the first plastograph.

The resulting mixture was ground, compression molded at 260° C. and characterized.

The so obtained mixture characteristics are indicated in the following Table.

Example 2 (comparison test)

Preparation of the composition

The operative modalities of example 1 were repeated, but the functionalized poly(2,6-di-methyl-1,4-phenylene)ether was substituted by the same polymer not previously subjected to the functionalization process with maleic anhydride.

The characteristics of the mixture so obtained are indicated in the following Table.

Example 3

Into a Brabender plastograph, equipped with a 50 ml cell and heated to 240° C., there was introduced a mixture, prepared at room temperature, of:

70% by weight of poly(2,6-di-methyl-1,4-phenylene)ether having an intrinsic viscosity of 0.47 (in chloroform at 23° C.);

30% by weight of a grafted EPDM elastomer with styrene having the same composition of example 1; and 1 part, for 100 parts by weight of the above-indicated mix, of maleic anhydride.

The Brabender mastication speed was programmed according to a cycle of 50-120-50 r.p.m. and the residence time of the mixture in the plastograph was of 4 minutes.

The mixture leaving this first plastograph was fed to a second plastograph of the same type together with nylon 6 and poly(2,6-dimethyl-1,4-phenylene)ether in the following proportions:

33.3% by weight of the mixture leaving the first plastograph;

41% by weight of nylon 6 produced by Montedipe S.r.l. under the trademark "TERNIL® B27", having an average molecular weight of 18,000, and 25.7% by weight of poly(2,6-di-methyl-1,4-phenylene)ether having an intrinsic viscosity of 0.47, in chloroform at 23° C.

The operative conditions were like the ones of the first plastograph.

The resulting mixture was ground, compression molded at 260° C. and characterized.

The characteristics are indicated in the following Table.

Example 4

Example 3 was repeated, varying only the maleic anhydride amount from 1% to 0.5% by weight calculated on the mixture of poly(2,6-di-methyl-1,4-phenylene)ether and EPDM grafted elastomer with styrene.

The characteristics of the resulting mixture are reported in Table I.

Example 3 was repeated, varying only the maleic anhydride amount from 1% to 1.5% by weight calculated on the mixture of poly(2,6-di-methyl-1,4-phenylene)ether and EPDM grafted elastomer with styrene.

The characteristics of the resulting mixture are indicated in Table I.

In Table I, the measured characteristics and the employed methods were as follows:

Mechanical properties

The IZOD notch resiliency was determined at 23° C., according to standard ASTM D 256, on 3.2 mm thick specimens.

Thermal properties

The VICAT softening temperature was determined at 1 kg and at 5 kg in oil, according to standard ISO 306.

Rheological properties

The melt flow index (M.F.I.) was determined at 270° C. and 10 kg according to standard ASTM D 1238.

TABLE I

| CHARACTER-ISTICS UNITS | IZOD RESILIENCY CY J/M | VICAT 1 Kg, °C. | VICAT 5 Kg, °C. | M.F.I g/10' |
|---|---|---|---|---|
| EXAMPLE 1 | 436 | 201 | 182 | 39 |
| EXAMPLE 2* | 28 | 199 | 178 | 59 |
| EXAMPLE 3 | 675 | 201 | 180 | 34 |
| EXAMPLE 4 | 615 | 200 | 181 | 45 |
| EXAMPLE 5 | 630 | 201 | 179 | 37 |

*Comparative example.

Examples 6–18

Examples 6–8 were prepared by repeating Example 3 of the application with the same composition and procedure, except that different samples of rubber were used in each experiment. These samples of rubber were prepared with the same EPDM rubber as that used in Example 3, grafted with about the same quantity of polystyrenes having different molecular weights in each case. The IZOD impact resistance of each composition was measured; the results have been reported in Table II.

TABLE II

| | $MW_{ps}$ | IZOD (J/m) |
|---|---|---|
| EXAMPLE 3 | 1,119,000 | 675 |
| EXAMPLE 6 | 930,000 | 630 |
| EXAMPLE 7 | 1,030,000 | 575 |
| EXAMPLE 8 | 1,410,000 | 605 |
| COMPARATIVE 1 | 450,000 | 105 |
| COMPARATIVE 2 | 1,960,000 | 78 |

As it can be clearly deduced from Table II, the compositions having a molecular weight of the grafted polystyrene comprised from about 900,000 to about 1,500,000 show a surprising increase of their impact resistance with respect to compositions with a polystyrene (PS) molecular weight lower than 500,000 and greater than 1,900,000.

On the other hand, a composition prepared as described in "preparation C" (col. 8., last paragraph) in U.S. Pat. No. 4,929,675 (Abe et al.) has resulted in a rubber grafted with a polystyrene having a molecular weight as low as 430,000 (see "comparative 1" above as an example of composition containing a PS grafted rubber similar to that one disclosed by Abe et al.).

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

The subject matter of all references cited hereinabove is incorporated by reference.

We claim:

1. A thermoplastic composition comprising: 100 parts by weight of a resinous composition comprising:
    (A) 5–95% by weight of a polyphenylene ether functionalized with a compound containing in its molecular structure at least a double or triple carbon-carbon bond and at least a carboxylic acid, anhydride, amide, imide, ester, amino, or hydroxyl group;
    (B) 95–5% by weight of a polyamide; and
    (C) 1–100 parts by weight, for 100 parts by weight of mixture A+B, of an olefinic elastomer containing, grafted thereon, a vinylaromatic monomer,
    wherein the olefinic elastomer is an ethylene/propylene/non-conjugated diene terpolymer, wherein the diene content is approximately from 2 to 20% by weight calculated on the terpolymer, said terpolymer having a Mooney viscosity, ML-4, at 100° C. ranging from 30 to 90, and an iodine number greater than 5,
    wherein the vinylaromatic polymer, formed during the graft polymerization of the vinylaromatic monomer, molecular weight (Mw) ranges from about 600,000 to about 1,700,000,
    wherein the vinylaromatic monomer content is greater than 1% by weight calculated on the grafted polymer, and
    wherein the vinylaromatic polymer is partially grafted on the rubber-like substrate and partially forms a polymer in physical admixture with the grafter polymer.

2. The thermoplastic composition according to claim 1, wherein the proportions of components A, B and C calculated on the total composition are:
    A. from 25 to 70% by weight of a functionalized polyphenylene ether;
    B. from 25 to 70% by weight of a polyamide, and
    C. from 5 to 50% by weight of an olefinic elastomer containing, grafted thereon, a vinylaromatic monomer;
    the sum of the three components A, B and C being equal to 100.

3. The thermoplastic composition according to claim 1, wherein the polyphenylene ether is a polymer or a copolymer containing a plurality of structural units of formula:

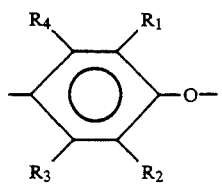

(I)

wherein $R_1$, $R_2$, $R_3$ and $R_4$ represent, independently of one another, a substituted or non substituted $C_1$–$C_{18}$ hydrocarbon radical, an atom of halogen or hydrogen.

4. The thermoplastic composition according to claim 3, wherein polyphenylene ether has the formula:

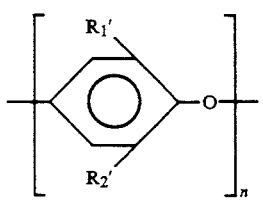

(II)

wherein $R'_1$, $R'_2$, independently of each other, are an alkyl radical containing from 1 to 4 carbon atoms and n is at least 50.

5. The thermoplastic composition according to claim 1, wherein the polyphenylene ether is poly(2,6-dimethyl1,4-phenylene)ether having a number average molecular weight ranging from 5,000 to 120,000 and an intrinsic viscosity greater than 0.1 dl/g, measured in chloroform at 23° C.

6. The thermoplastic composition according to claim 1, wherein the functionalizing compound is selected from maleic anhydride, maleimide and fumaric acid.

7. The thermoplastic composition according to claim 1, wherein the functionalizing compound content ranges from 0.01 to 5 parts by weight for 100 parts by weight of polyphenylene ether.

8. The thermoplastic composition according to claim 1, wherein the polyamide is nylon 6 or nylon 6,6.

9. The thermoplastic composition according to claim 1, wherein the vinylaromatic monomer has formula:

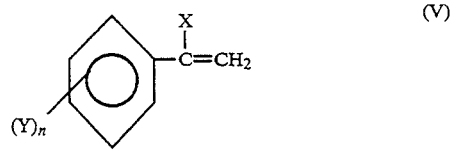

(V)

wherein:
X represents hydrogen or an alkyl radical having from 1 to 4 carbon atoms;
Y represents hydrogen, a halogen or an alkyl radical having from 1 to 4 carbon atoms, and
n is 0 or an integer ranging from 1 to 5.

10. The thermoplastic composition according to claim 1, wherein the vinylaromatic polymer molecular weight (Mw) is between about 900,000 and about 1,300,000.

11. The thermoplastic composition according to claim 1, wherein the amount of grafted vinylaromatic monomer ranges from 10 to 50% by weight and the amount of free polymer ranges from 20 to 50% by weight.

12. The thermoplastic composition according to claim 1, further containing, in addition, reinforcing additives, antiflame agents, dyestuffs, pigments, stabilizers and/or lubricants.

13. The thermoplastic composition according to claim 12, wherein the reinforcing additive is selected from glass fibers, carbon fibers, organic and inorganic high-modulus fibers and metal fibers in an amount not greater than 50% by weight calculated on the total composition.

14. The thermoplastic composition according to claim 1, wherein the vinyl aromatic monomer content in the olefinic elastomer ranges from 30 to 60% by weight calculated on the grafted polymer.

15. The thermoplastic composition according to claim 4, wherein n range from 60 to about 600.

16. The thermoplastic composition according to claim 5, wherein the intrinsic viscosity ranges from 0.30 to 0.90 dl/g.

17. The thermoplastic composition according to claim 7, wherein the functionalizing compound content ranges from 0.01 to 3.

18. The thermoplastic composition according to claim 1, wherein the other copolymerizable polyene monomer is a non-conjugated diene.

19. The thermoplastic composition according to claim 1, wherein the diene content is from 8 to 18%.

20. The thermoplastic composition according to claim 1, wherein the iodine number ranges from 10 to 40.

21. The thermoplastic composition according to claim 13, wherein the reinforcing additive is not greater than 30%.

* * * * *